US012600685B2

(12) United States Patent　　　　(10) Patent No.:　US 12,600,685 B2
Beals et al.　　　　　　　　　　　　(45) Date of Patent:　　Apr. 14, 2026

(54) ENVIRONMENTAL BARRIER COATING AND METHOD OF MAKING THE SAME

(71) Applicant: Raytheon Technologies Corporation, Farmington, CT (US)

(72) Inventors: James T. Beals, West Hartford, CT (US); Justin B. Alms, Coventry, CT (US); Olivier H. Sudre, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 801 days.

(21) Appl. No.: 17/879,392

(22) Filed: Aug. 2, 2022

(65) Prior Publication Data

US 2024/0043348 A1　　Feb. 8, 2024

(51) Int. Cl.
C04B 41/45　　　　(2006.01)
C04B 41/00　　　　(2006.01)
C04B 41/87　　　　(2006.01)

(52) U.S. Cl.
CPC ........ C04B 41/455 (2013.01); C04B 41/0072 (2013.01); C04B 41/4543 (2013.01); C04B 41/87 (2013.01); *C04B 2235/528* (2013.01); *C04B 2235/9684* (2013.01)

(58) Field of Classification Search
None
See application file for complete search history.

(56) References Cited

U.S. PATENT DOCUMENTS

| | | | |
|---|---|---|---|
| 2014/0342093 A1 | 11/2014 | Hadidi et al. | |
| 2016/0332922 A1* | 11/2016 | Tang ..................... | C04B 35/195 |
| 2021/0246080 A1 | 8/2021 | Jackson et al. | |
| 2021/0246082 A1 | 8/2021 | Jackson et al. | |

FOREIGN PATENT DOCUMENTS

| | | |
|---|---|---|
| EP | 2497746 | 9/2012 |
| EP | 3862338 | 8/2021 |
| WO | 2022178265 | 8/2022 |

OTHER PUBLICATIONS

Berean et al, The effect of crosslinking temperature on the permeability of PDMS membranes: Evidence of extraordinary CO2 and CH4 gas permeation, Separation and Purification Technology, Accessed Jun. 6, 2025 (Year: 2014).*

(Continued)

*Primary Examiner* — Abbas Rashid
*Assistant Examiner* — Adrianna N Konves
(74) *Attorney, Agent, or Firm* — Carlson, Gaskey & Olds, P.C.

(57)　　　　ABSTRACT

A method of making spherical gettering particles for an environmental barrier coating according to an exemplary embodiment of this disclosure, among other possible things includes spraying liquid preceramic polymer into a chamber via a nozzle to form liquid droplets, curing the liquid droplets to form spherical particles in the chamber, and converting the spherical particles to spherical ceramic gettering particles in a fluidized bed. A method of making spherical gettering particles for an environmental barrier coating and an article are also disclosed.

11 Claims, 4 Drawing Sheets

(56)  References Cited

OTHER PUBLICATIONS

Czosnek et al., "Particle morphology of various SiC-based nanocomposite powders made by the aerosol-assisted synthesis method", Journal of Nanoscience and Nanotechnology, vol. 8, No. 2, Feb. 2008, pp. 907-913.

Czosnek et al., "Preparation of silicon carbide SiC-based nanopowders by the aerosol-assisted synthesis and the DC thermal plasma synthesis methods", Materials Research Bulletin, vol. 63, Dec. 4, 2014, pp. 164-172.

European Search Report for European Patent Application No. 23188495.8 dated Dec. 15, 2023.

* cited by examiner

SPRAY LIQUID PRECERAMIC POLYMER INTO CHAMBER VIA NOZZLE TO FORM DROPLETS ⎯302

DRY AND/OR CURE THE DROPLETS TO FORM SPHERICAL PARTICLES ⎯304

CONVERT THE SPHERICAL PARTICLES TO CERAMIC GETTERING PARTICLES ⎯306

ENVIRONMENTAL BARRIER COATING AND METHOD OF MAKING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include a protective barrier coating.

SUMMARY

A method of making spherical gettering particles for an environmental barrier coating according to an exemplary embodiment of this disclosure, among other possible things includes spraying liquid preceramic polymer into a chamber via a nozzle to form liquid droplets, curing the liquid droplets to form spherical particles in the chamber, and converting the spherical particles to spherical ceramic gettering particles in a fluidized bed.

In a further example of the foregoing, the method also includes preheating the liquid preceramic polymer prior to the spraying step to induce cross-linking within the liquid preceramic polymer.

In a further example of any of the foregoing, the preheating occurs at a temperature below about 100 degrees C.

In a further example of any of the foregoing, the curing occurs at a temperature below a temperature necessary to convert the liquid preceramic polymer into a ceramic.

In a further example of any of the foregoing, the curing occurs at a temperature below about 500 degrees C.

In a further example of any of the foregoing, cross-linking of the preceramic polymer occurs during the curing.

In a further example of any of the foregoing, the conversion includes heating the spherical particles to a temperature above a temperature used in the curing step.

In a further example of any of the foregoing, the curing occurs at a temperature between about 1000 and about 1500 degrees C.

In a further example of any of the foregoing, the conversion step does not induce sintering of the spherical particles.

In a further example of any of the foregoing, the chamber is filled with an inert gas.

In a further example of any of the foregoing, the method also includes providing a catalyst with the liquid preceramic polymer, the catalyst operable to lower the curing temperature of the liquid preceramic polymer and increase its solidification rate.

In a further example of any of the foregoing, the method also includes combining the spherical ceramic gettering particles with matrix material and diffusive particles in a carrier fluid to form a slurry, applying the slurry to a substrate, curing the slurry to form a bond coat on the substrate.

In a further example of any of the foregoing, the method also includes sintering the bond coat after the curing step.

A method of making spherical gettering particles for an environmental barrier coating according to an exemplary embodiment of this disclosure, among other possible things includes spraying liquid preceramic polymer into a chamber via a nozzle to form a stream of liquid droplets, curing the liquid droplets to form spherical particles in the chamber, and converting the spherical particles to spherical ceramic gettering particles by directing the stream of cured particles through a torch.

In a further example of the foregoing, the curing occurs at a temperature below a temperature necessary to convert the liquid preceramic polymer into a ceramic.

In a further example of any of the foregoing, the curing occurs at a temperature below about 500 degrees C.

In a further example of any of the foregoing, the torch is at least partially fueled by hydrogen evolved from the liquid droplets during the curing step.

In a further example of any of the foregoing, the method also includes combining the spherical ceramic gettering particles with matrix material and diffusive particles in a carrier fluid to form a slurry, applying the slurry to a substrate, curing the slurry to form a bond coat on the substrate.

In a further example of any of the foregoing, the method also includes sintering the bond coat after the curing step.

An article according to an exemplary embodiment of this disclosure, among other possible things includes a substrate and a bond coat disposed on the substrate. The bond coat has a porosity less than about 25%. The bond coat includes a matrix and a plurality of spherical gettering particles disposed in the matrix. About 100% of the spherical gettering particles have an aspect ratio of about 1. The bond coat also includes a plurality of diffusive particles disposed in the matrix.

DETAILED DESCRIPTION

Figure 1:
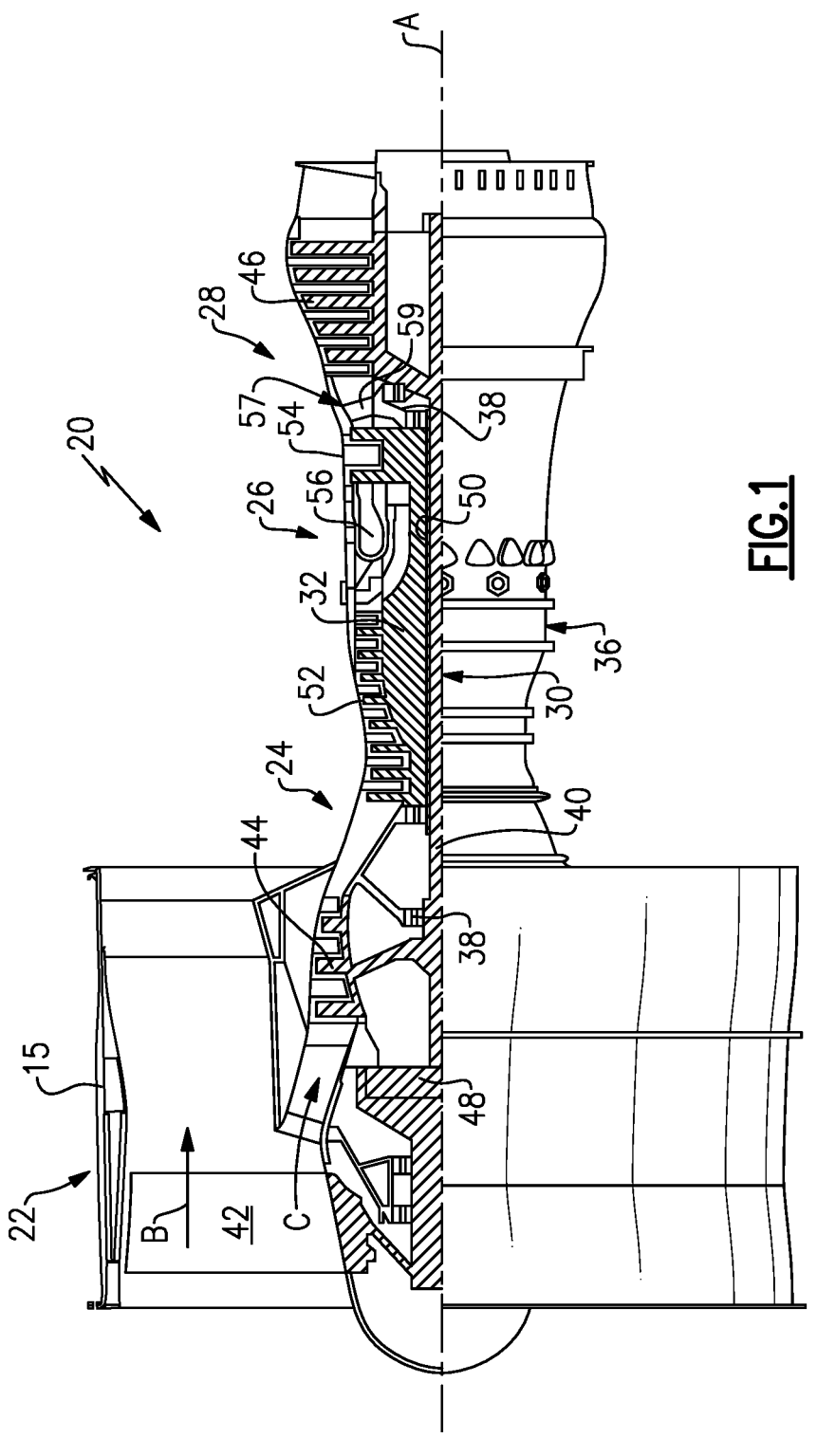
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures as well as turboprops.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram ° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
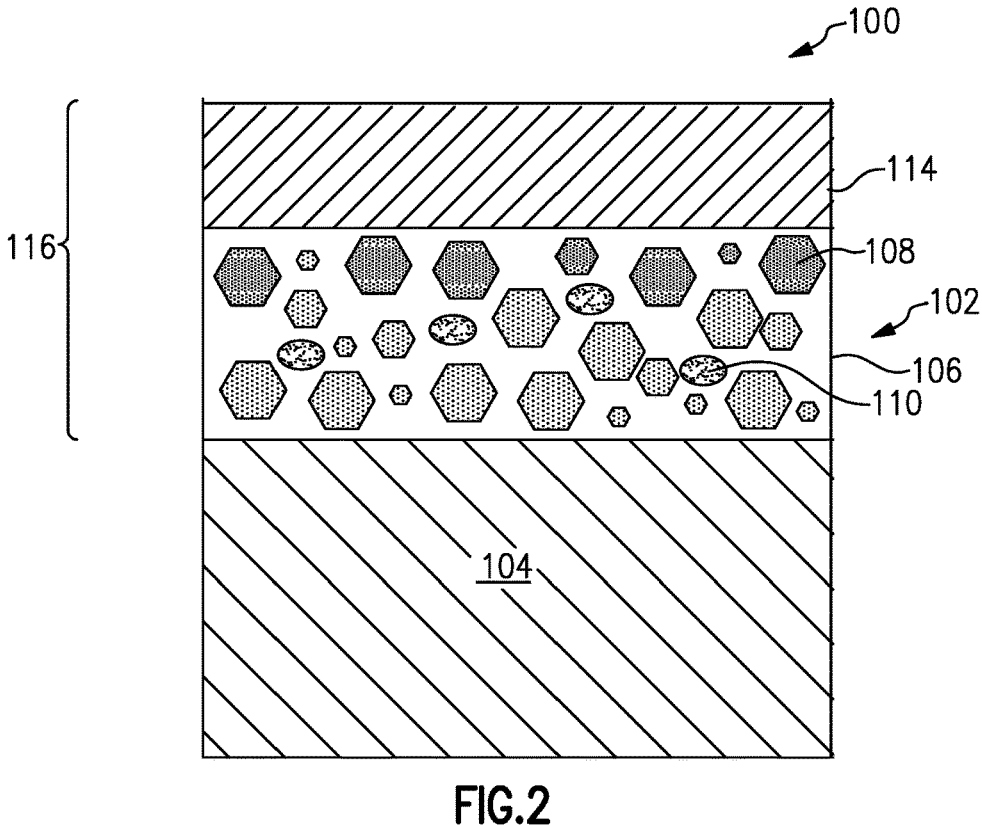
FIG. 2 illustrates an article for the gas turbine engine of claim 1 with a coating.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions. As will be appreciated, the bond coat 102 can be used as a stand-alone barrier layer, as an outermost/top coat with additional underlying layers, or in combination with other coating under- or over-layers, such as, but not limited to, ceramic-based topcoats.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide. Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

A ceramic-based top coat 114 may be interfaced directly with the bond coat 102. The top coat 114 is discussed in more detail below. The top coat 114 and bond coat 102 together form a barrier coating 116 for the substrate 104. The top coat 114, when used, is the outermost layer of the barrier coating 116, and is exposed to the elements when the article 100 is in use. The top coat 114 includes an oxide-based material. The oxide-based material can be, for instance, hafnium-based oxides or yttrium-based oxides (such as hafnia, hafnium silicate, yttrium silicates, ytterbium silicates, other rare-each silicates, yttria stabilized zirconia or gadolinia stabilized zirconia), calcium aluminosilicates, mullite, barium strontium aluminosilicate, or combinations thereof, but is not limited to such oxides.

The bond coat 102 is in some examples applied to the substrate 104 via a slurry coating method. Slurry coating methods are well known in the art, and typically involve applying a slurry comprising a carrier liquid with bond coat 102 constituents, including gettering particles 108, to the substrate 104, and then curing the slurry to form the bond coat 102. One typical way to provide particle constituents for a slurry is to crush a desired material into a powder. However, this results in highly irregular particles with high aspect ratio, jagged edges, and a distribution of ultrafine particles. The high aspect ratio, jagged particles lead to poor packing when the slurry is applied, increasing the porosity of the bond coat, which can be undesirable in certain circumstances. Also, the high aspect ratio, jagged particles can inhibit the use of certain slurry application methods such as spraying, because the particles tend to have low flowability and can clog the nozzle. Moreover, the ultrafine particles can debit performance of the resulting material by decreasing its mechanical integrity. In addition, the ultrafine particles have high surface area, meaning they are prone to rapid oxidation in the case of gettering particles 108 as discussed above, debiting the long-term durability and lifetime of the bond coat 102.

To that end, the present gettering particles 108 are substantially spherical, e.g., they have an aspect ratio of about 1. More particularly, about 100% of the gettering particles 108 in the bond coat 102 have an aspect ratio of about 1. The spherical particles improve the flowability and packing of the gettering particles 108, enabling the use of spraying methods to apply the slurry and decreasing the porosity of the resulting bond coat 102. In some examples, the porosity of the bond coat 102 is less than about 25%. In further examples, the porosity is less than about 10%. In further examples, the porosity is less than about 5%.

Figure 3:
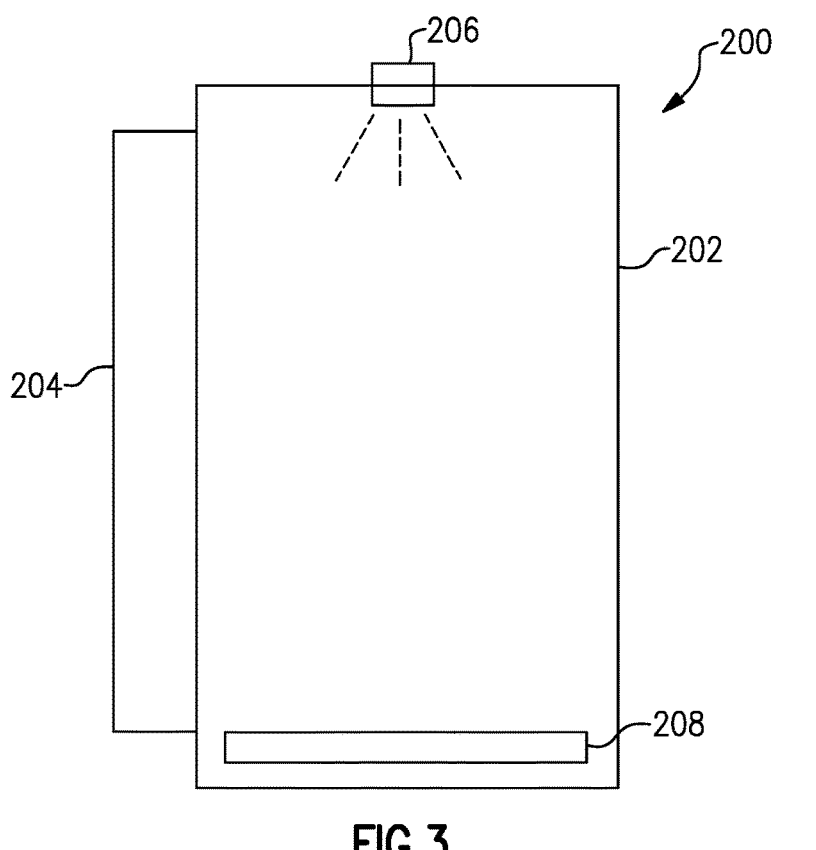
FIG. 3 illustrates an example apparatus for making spherical gettering particles for the coating of FIG. 2.
Figure 4:
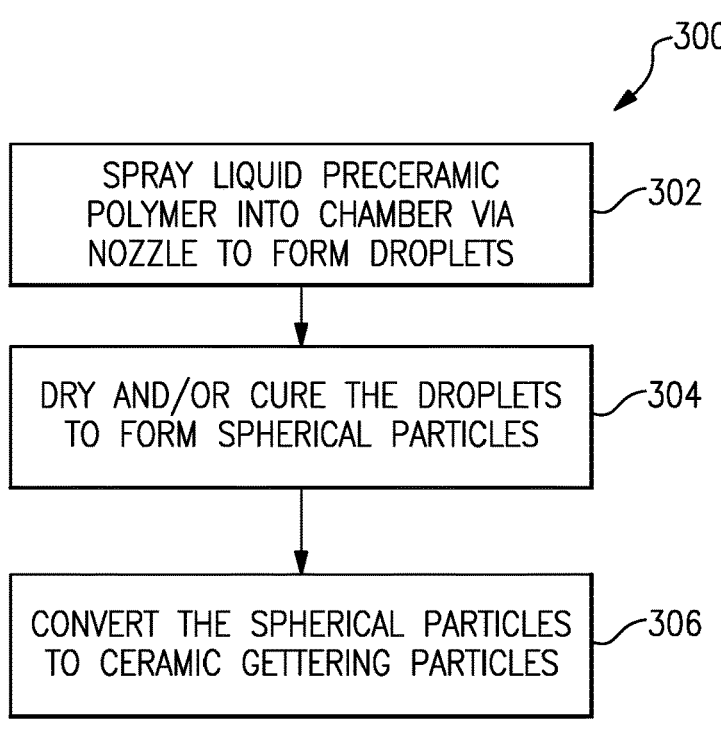
FIG. 4 illustrates an example method for making spherical gettering particles with the apparatus of FIG. 3.

FIG. 4 shows an example method 300 for making the spherical gettering particles 108 by spray drying. FIG. 3 shows an example apparatus 200 for making spherical gettering particles 108. The apparatus 200 includes a chamber 202, one or more heaters 204 operable to heat the chamber, and a nozzle 206.

In step 302, a preceramic polymer in liquid form is sprayed into the chamber 202 via the nozzle 206. The liquid preceramic polymer can be pre-heated to a low temperature, e.g., a temperature below about 100 degrees C., to induce cross-linking during the spraying. The spraying causes atomization of the preceramic polymer, e.g., causes spherical droplets of the liquid preceramic polymer to form in the chamber 202. In one example, the chamber 202 is filled with an inert gas such as argon.

In step 304, the droplets are dried and/or cured while flowing through the chamber 202, but before landing on a collection surface 208 within the chamber 202, to form spherical particles. For instance, the chamber 202 and inert gas, if used, can be heated by the heater 204 to a temperature suitable to dry/cure the droplets but that is generally below about 500 degrees C. In one example where preheating is not used in step 302, the cross-linking occurs during step 304. In general, the heating in step 304 is at a temperature below the temperature necessary to convert the preceramic polymer into a ceramic.

In a particular example, a catalyst is sprayed with the preceramic polymer in step 302. The catalyst is operable to lower the curing temperature required in step 304 and increase the solidification rate for the spherical particles to form. The catalyst is selected based on the composition of the preceramic polymer and the desired composition of the gettering particles 108. Such catalysts are well known in the art and will not be described herein.

In step 306, the spherical particles are converted to ceramic gettering particles by any known method, such as pyrolysis. In general, the conversion includes heating the spherical particles to a temperature above that used in step 304. For example, the temperature may be between about 1000 and about 1500 degrees C. The conversion is achieved in a fluidized bed, which are well known in the art. That is, the spherical particles are removed from the chamber 202 and are converted in a separate fluidized bed. An inert fluid such as argon gas is used as the fluid in the fluidized bed. The fluidized bed environment and selected temperature do not induce sintering of the spherical particles during the conversion step. Sintering of the particles occurs only after the particles are applied as part of the bond coat 102. Additionally, the fluidized bed provides a controlled environment for the conversion and prevents unwanted reactions with hydrogen, oxygen, or other elements during the conversion step.

In a particular example, the method 300 is used to make silicon carbide gettering particles. In step 302, a silicon carbide precursor such as StarPCT™ SMP-10 (Starfire Systems) is sprayed into the chamber 202 via the nozzle 206 to form droplets. In step 304, the droplets are dried and cured at about 400 degrees C. while flowing through the chamber 202 to make spherical particles. In step 306, the spherical particles are converted to silicon carbide spherical particles at about 1200 to about 1400 degrees C.

Figure 5:
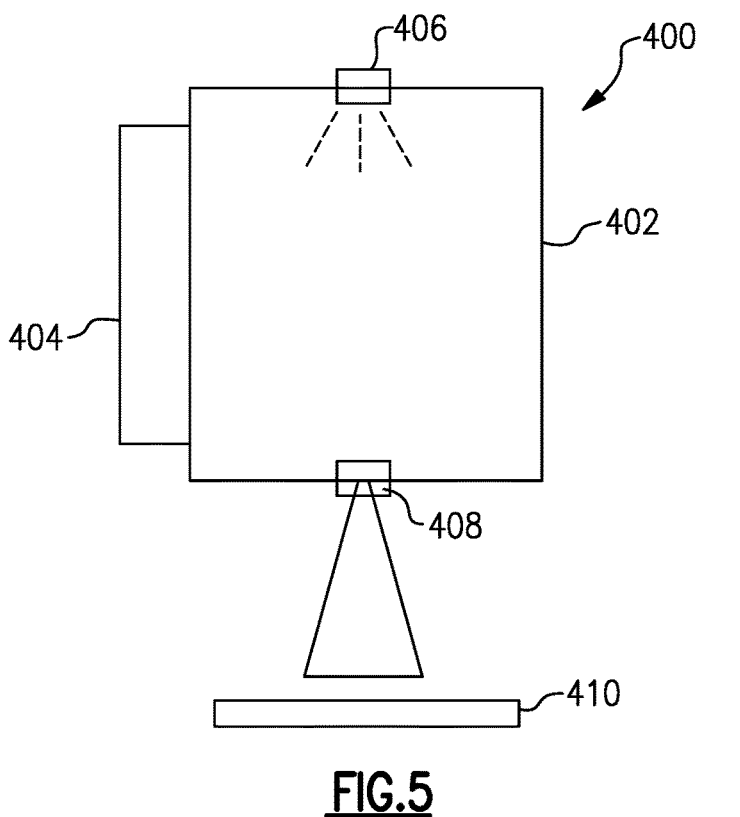
FIG. 5 illustrates another example apparatus for making spherical gettering particles for the coating of FIG. 2.

FIG. 5 shows another example apparatus 400 for making spherical gettering particles 108. The apparatus 400 includes a chamber 402, one or more heaters 404 operable to heat the chamber 402, and a nozzle 406 at one end of the chamber 400. A torch 408 is arranged at a second end of the chamber 402 opposite from the nozzle 406. The torch is directed towards a collection surface 410.

Figure 6:
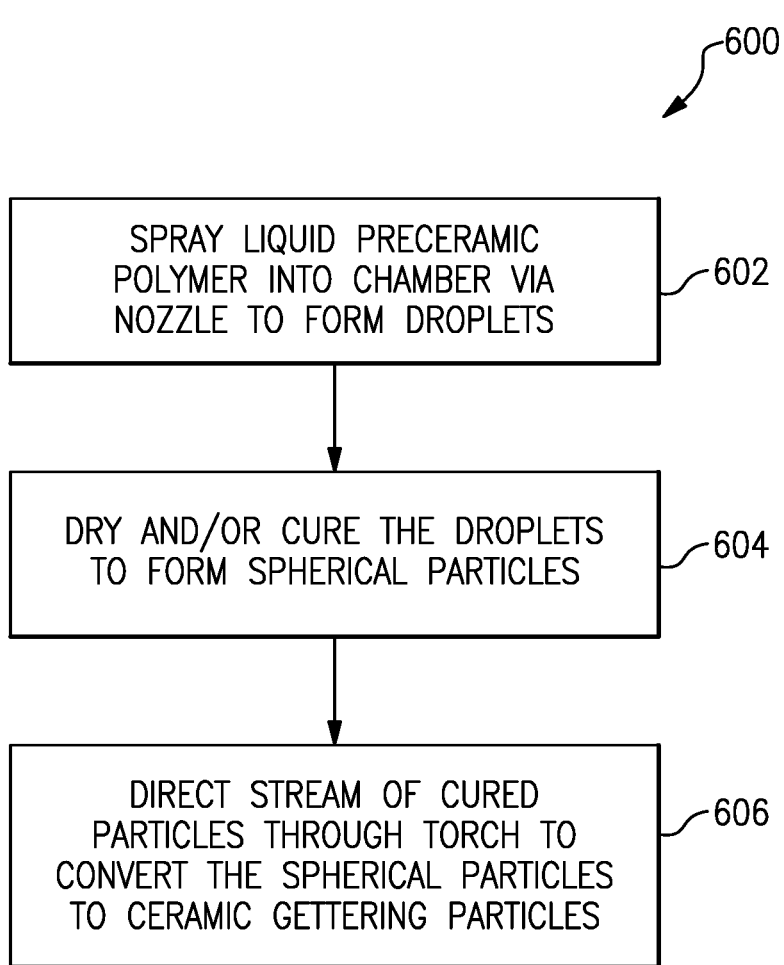
FIG. 6 illustrates another example method for making spherical gettering particles with the apparatus of FIG. 5.

FIG. 6 shows another example method of making spherical gettering particles 108 with the apparatus 400. In step 602, liquid preceramic polymer is sprayed into the chamber 402 via the nozzle 406 towards the torch 408. The droplets form a stream in the chamber 402. The spraying causes atomization of the preceramic polymer, e.g., causes spherical droplets of the liquid preceramic polymer to form in the chamber 402. In one example, the chamber 402 is filled with an inert gas such as argon, or another gas such as oxygen or air.

In step 604, the droplets are dried and/or cured while flowing through the chamber 402 in the stream, but before reaching the torch 408, to form spherical particles. For instance, the chamber 402 and gas within the chamber 402 can be heated by the heater 404 to a temperature a temperature suitable to dry/cure the droplets but that is generally below about 500 degrees C. In general, the heating in step 604 is at a temperature below the temperature necessary to convert the preceramic polymer into a ceramic.

In a particular example, a catalyst is sprayed with the preceramic polymer in stop 602. The catalyst is operable to lower the curing temperature required in step 604 and increase the solidification rate for the spherical particles to form. The catalyst is selected based on the composition of the preceramic polymer and the desired composition of the gettering particles 108. Such catalysts are well known in the art and will not be described herein.

In step 606, the stream of cured particles is directed into the torch 408, which is ignited. The torch 408 is fueled by hydrogen/air/oxygen/other fuel. In a particular example, all or some of the fuel is hydrogen that is evolved from the particles during the curing in step 604. As the particles pass through the torch 408 and onto the collecting surface 410, they are converted to ceramic gettering particles 108 by pyrolysis. In this way, the method 600 can be operated in a continuous process.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of making spherical gettering particles for an environmental barrier coating, comprising:
    spraying liquid preceramic polymer into a chamber via a nozzle to form liquid droplets;
    curing the liquid droplets to form spherical particles in the chamber; and
    converting the spherical particles to spherical ceramic gettering particles in a fluidized bed,
    wherein the curing occurs at a temperature below a temperature necessary to convert the liquid preceramic polymer into a ceramic,
    wherein the curing occurs at a temperature below about 500 degrees C.

2. The method of claim 1, further comprising preheating the liquid preceramic polymer prior to the spraying step to induce cross-linking within the liquid preceramic polymer.

3. The method of claim 2, wherein the preheating occurs at a temperature below about 100 degrees C.

4. A method of making spherical gettering particles for an environmental barrier coating, comprising:
    spraying liquid preceramic polymer into a chamber via a nozzle to form liquid droplets;
    curing the liquid droplets to form spherical particles in the chamber; and
    converting the spherical particles to spherical ceramic gettering particles in a fluidized bed,
    wherein the curing occurs at a temperature below a temperature necessary to convert the liquid preceramic polymer into a ceramic,
    wherein cross-linking of the preceramic polymer occurs during the curing.

5. The method of claim 1, wherein in the conversion includes heating the spherical particles to a temperature above a temperature used in the curing step.

6. The method of claim 5, wherein the curing occurs at a temperature between about 1000 and about 1500 degrees C.

7. The method of claim 1, wherein the conversion step does not induce sintering of the spherical particles.

8. The method of claim 1, wherein the chamber is filled with an inert gas.

9. A method of making spherical gettering particles for an environmental barrier coating, comprising:
    spraying liquid preceramic polymer into a chamber via a nozzle to form liquid droplets;
    curing the liquid droplets to form spherical particles in the chamber; and
    converting the spherical particles to spherical ceramic gettering particles in a fluidized bed,
    further comprising providing a catalyst with the liquid preceramic polymer, the catalyst operable to lower the curing temperature of the liquid preceramic polymer and increase its solidification rate.

10. The method of claim 1, further comprising combining the spherical ceramic gettering particles with matrix material and diffusive particles in a carrier fluid to form a slurry, applying the slurry to a substrate, curing the slurry to form a bond coat on the substrate.

11. The method of claim 10, further comprising sintering the bond coat after the curing step.

* * * * *